(12) United States Patent
Lu

(10) Patent No.: US 11,494,079 B2
(45) Date of Patent: Nov. 8, 2022

(54) METHOD FOR ALLOCATING ADDRESS SPACE USED BY MMIO AND COMPUTER SYSTEM UTILIZING THE SAME

(71) Applicant: MITAC COMPUTING TECHNOLOGY CORPORATION, Taoyuan (TW)

(72) Inventor: Ching-Hsiang Lu, Taoyuan (TW)

(73) Assignee: MITAC COMPUTING TECHNOLOGY CORPORATION, Taoyuan (TW)

(*) Notice: Subject to any disclaimer, the term of this patent is extended or adjusted under 35 U.S.C. 154(b) by 22 days.

(21) Appl. No.: 17/360,626

(22) Filed: Jun. 28, 2021

(65) Prior Publication Data
US 2021/0405873 A1    Dec. 30, 2021

(30) Foreign Application Priority Data
Jun. 30, 2020   (TW) ................................. 109122005

(51) Int. Cl.
| G06F 9/44 | (2018.01) |
| G06F 3/06 | (2006.01) |
| G06F 13/42 | (2006.01) |
| G06F 9/4401 | (2018.01) |

(52) U.S. Cl.
CPC ............ *G06F 3/061* (2013.01); *G06F 3/0655* (2013.01); *G06F 3/0679* (2013.01); *G06F 9/4401* (2013.01); *G06F 13/4221* (2013.01)

(58) Field of Classification Search
CPC ...... G06F 3/061; G06F 3/0655; G06F 3/0679; G06F 9/4401; G06F 13/4221

USPC ......................................................... 711/154
See application file for complete search history.

(56) References Cited

U.S. PATENT DOCUMENTS

| 2002/0129186 A1* | 9/2002 | Emerson ............. G06F 13/4081 710/302 |
| 2003/0149828 A1* | 8/2003 | Nijhawan ............. G06F 9/5016 711/2 |
| 2004/0205399 A1* | 10/2004 | Wang .................. G06F 11/0769 714/E11.026 |
| 2004/0255075 A1* | 12/2004 | Huang ................ G06F 11/2284 711/170 |
| 2006/0047858 A1* | 3/2006 | Atherton ............... G06F 9/4411 710/1 |
| 2007/0118717 A1* | 5/2007 | Sanada ............... G06F 12/0646 711/173 |

(Continued)

*Primary Examiner* — Christopher B Shin
(74) *Attorney, Agent, or Firm* — Lewis Roca Rothgerber Christie LLP

(57) ABSTRACT

A method includes steps of: assigning a value of a setting variable to a memory allocation variable; allocating address space to peripheral devices based on the memory allocation variable; determining whether allocated address space is sufficient; acquiring a system-wise greatest demand size value when allotted address space is insufficient; determining whether the memory allocation variable exceeds the system-wise greatest demand size value; updating the memory allocation variable to have a larger value when the memory allocation variable does not exceed the system-wise greatest demand size value; and assigning the value of the memory allocation variable to the setting variable when the memory allocation variable exceeds the system-wise greatest demand size value.

20 Claims, 4 Drawing Sheets

(56) References Cited

U.S. PATENT DOCUMENTS

| | | | |
|---|---|---|---|
| 2012/0047335 A1* | 2/2012 | Yamada | G06F 30/33 |
| | | | 711/E12.001 |
| 2012/0124323 A1* | 5/2012 | Lu | G06F 12/0223 |
| | | | 711/E12.078 |
| 2012/0278655 A1* | 11/2012 | Lin | G06F 11/2268 |
| | | | 714/E11.178 |
| 2014/0006644 A1* | 1/2014 | Pullagoundapatti | |
| | | | G06F 12/0284 |
| | | | 710/4 |
| 2018/0130545 A1* | 5/2018 | Li | G11C 29/36 |
| 2019/0095095 A1* | 3/2019 | McCarthy | G06F 3/0482 |
| 2022/0269565 A1* | 8/2022 | Chou | G06F 13/1668 |

* cited by examiner

METHOD FOR ALLOCATING ADDRESS SPACE USED BY MMIO AND COMPUTER SYSTEM UTILIZING THE SAME

CROSS-REFERENCE TO RELATED APPLICATION

This application claims priority of Taiwanese Invention Patent Application No. 109122005, filed on Jun. 30, 2020.

FIELD

The disclosure relates to memory-space allocation, and more particularly to a method for allocating address space to be used by memory-mapped input/output (MMIO), and a computer system utilizing the method.

BACKGROUND

When performing a power-on self-test (POST) procedure of a Basic Input/Output system (BIOS), a central processing unit (CPU) of a server utilizes a conventional memory-address mapping technique to allocate memory address space (referred to as "address space" hereinafter) for Peripheral Component Interconnect Express (PCIe) devices such as a network interface card (NIC), a graphics processing unit (GPU), a video accelerator, etc. The address space allocated for the PCIe devices is reserved for the PCIe devices only and would not be further allocated for use by normal system memory of the server. Booting of the server cannot be successfully performed when the address space allocated for any of the PCIe devices is insufficient. Each time the server per forms the POST procedure, the server using the conventional memory-address mapping technique requires manual operation of a user to determine a required size of address space to be allocated for each PCIe device, and to adjust the amount of address space that is actually allocated for each of the PCIe devices based on the required size. For example, in a case where the server includes three PCIe devices that need address space of 2 gigabytes (GB), 10 GB and 20 GB, respectively, and where the conventional memory-address mapping technique provides size options of 1 GB, 4 GB, 16 GB, 64 GB, 256 GB and 1024 GB for allocating address space, the user would have to determine that the greatest required size of address space is 20 GB, and manually select the size option of 64 GB in view of the greatest required size of address space of 20 GB during the POST procedure, so that 64 GB of address space would be allocated for each of the three PCIe devices, individually. The conventional memory-address mapping technique that involves said manual operation lacks efficiency in aspects of time and human resources.

SUMMARY

Therefore, an object of the disclosure is to provide a method for allocating address space to be used by memory-mapped input/output (MMIO) that can alleviate at least one of the drawbacks of the prior art. Another object of the disclosure is to provide a computer system that utilizes the method.

According to one aspect of the disclosure, the method is to be performed by a processing unit performing a power-on self-test (POST) procedure. The processing unit is included in a computer system that further includes a storage unit, in which a basic input/output system (BIOS) code that can be executed by the processing unit to perform the POST procedure is stored, and multiple peripheral root ports electrically connected to multiple peripheral devices, wherein each of the peripheral root ports is electrically connected to at least one peripheral device among the multiple peripheral devices. The method includes steps of: A) determining whether a first setting variable is assigned a value in the BIOS code; B) when it is determined in step A) that the first setting variable is assigned a value in the BIOS code, assigning the value of the first setting variable to a memory allocation variable that is related to a space size for allocating the address space; C) when it is determined in step A) that the first setting variable is not assigned a value in the BIOS code, assigning a first predetermined value to the memory allocation variable; D) for each of the peripheral devices, allocating address space to the peripheral device based on the memory allocation variable; E) after step D), determining whether every one of the peripheral devices has been allocated a sufficient amount of the address space; F) when it is determined in step E) that not every one of the peripheral devices has beer, allocated a sufficient amount of the address space, acquiring a system-wise greatest demand size value related to address space sizes respectively demanded by the peripheral devices; G) after step F), determining whether the memory allocation variable exceeds the system-wise greatest demand size value; H) when it is determined in step G) that the memory allocation variable does not exceed the system-wise greatest demand size value, updating the memory allocation variable to have a larger value; and I) when it is determined in step G) that the memory allocation variable exceeds the system-wise greatest demand size value, assigning the value of the memory allocation variable to the first setting variable, and then controlling the computer system to reboot.

According to one aspect of the disclosure, the computer system includes a processing unit, a storage unit electrically connected to the processing unit, a peripheral interconnect bus electrically connected to the processing unit, multiple peripheral root ports electrically connected to the peripheral interconnect bus, and multiple peripheral devices electrically connected to the peripheral root ports, wherein each of the multiple peripheral root ports is electrically connected to at least one peripheral device among the peripheral devices. The storage unit stores a basic input/output system (BIOS) code that can be executed by the processing unit to perform a power-on self-test (POST) procedure. The processing unit is configured to, when performing the POST procedure, determine whether a first setting variable is assigned a value in the BIOS code. The processing unit is configured to, when it is determined that the first setting variable is assigned a value in the BIOS code, assign the value of the first setting variable to a memory allocation variable that is related to a space size for allocating the address space. The processing unit is configured to, when it is determined that the first setting variable is not assigned a value in the BIOS code, assign a first predetermined value to the memory allocation variable. The processing unit is configured to, when performing the POST procedure and for each of the peripheral devices, allocate address space to the peripheral device based on the memory allocation variable. The processing unit is configured to, when performing the POST procedure, determine whether every one of the peripheral devices has been allocated a sufficient amount of the address space. The processing unit is configured to, when it is determined that not every one of the peripheral devices has been allocated a sufficient amount of the address space, acquire a system-wise greatest demand size, value related to address space sizes respectively demanded by the peripheral devices. The processing unit is configured to, when performing the POST procedure, determine whether the memory allocation variable exceeds the system-wise greatest demand size value. The processing unit is configured to, when it is determined that the memory allocation variable does not exceed the system-wise greatest demand size value, update the memory allocation variable to have a larger value. The processing unit is configured to, when it is determined that the memory allocation variable exceeds the system-wise greatest demand size value, assign the value of the memory allocation variable to the first setting variable, and then controlling the computer system to reboot.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
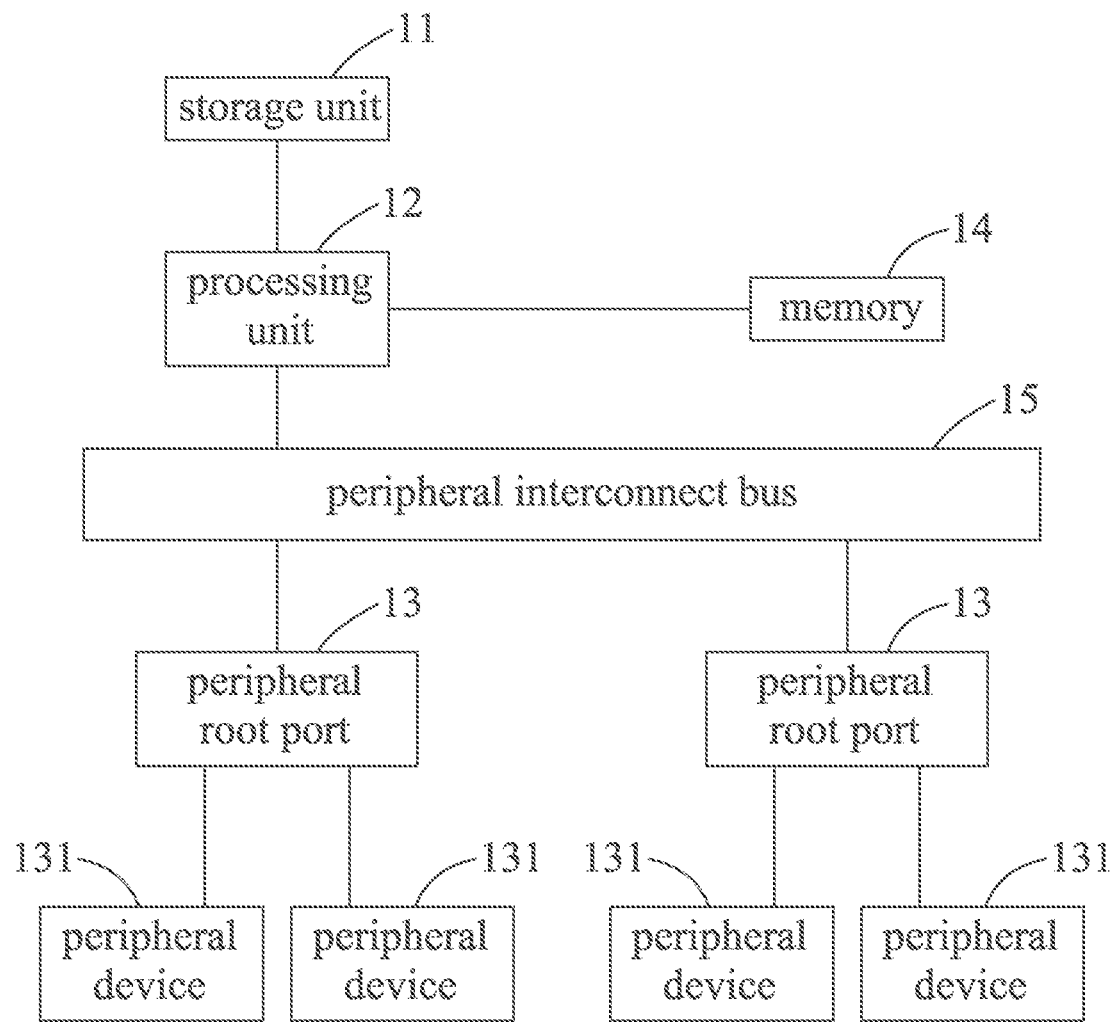
FIG. 1 is a block diagram that exemplarily illustrates a computer system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 exemplarily illustrates a computer system according to an embodiment of the disclosure. The computer system includes a storage unit 11, a processing unit 12 electrically connected to the storage unit 11, memory 14 electrically connected to the processing unit 12, a peripheral interconnect bus 15 electrically connected to the processing unit 12, multiple peripheral root ports 13 electrically connected to the peripheral interconnect bus 15, and multiple peripheral devices 131, wherein each of the peripheral root ports 13 is electrically connected to at least one peripheral device 131.

A basic input/output system (BIOS) code that can be executed by the processing unit 12 to perform a power-on self-test (POST) procedure is stored in the storage unit 12. According to some embodiments of the disclosure, the storage unit 11 may be implemented by, for example, read-only memory (ROM) or flash memory.

The memory 14 is accessible by the processing unit 12. According to some embodiments of the disclosure, the memory 14 may be implemented by, for example, dynamic random-access memory (DRAM).

According to some embodiments of the disclosure, the processing unit 12 may be implemented by, for example, a central processing unit (CPU). According to some embodiments of the disclosure, the peripheral interconnect bus 15 may be implemented by, for example, a Peripheral Component Interconnect Express (PCIe) bus. According to some embodiments of the disclosure, the peripheral root ports 13 may each be implemented by, for example, a PCIe root port. According to some embodiments of the disclosure, the peripheral devices 131 may be implemented by, for example, PCIe devices such as a network interface card (NIC), a graphics processing unit (GPU), a video accelerator, etc.

Figure 2:
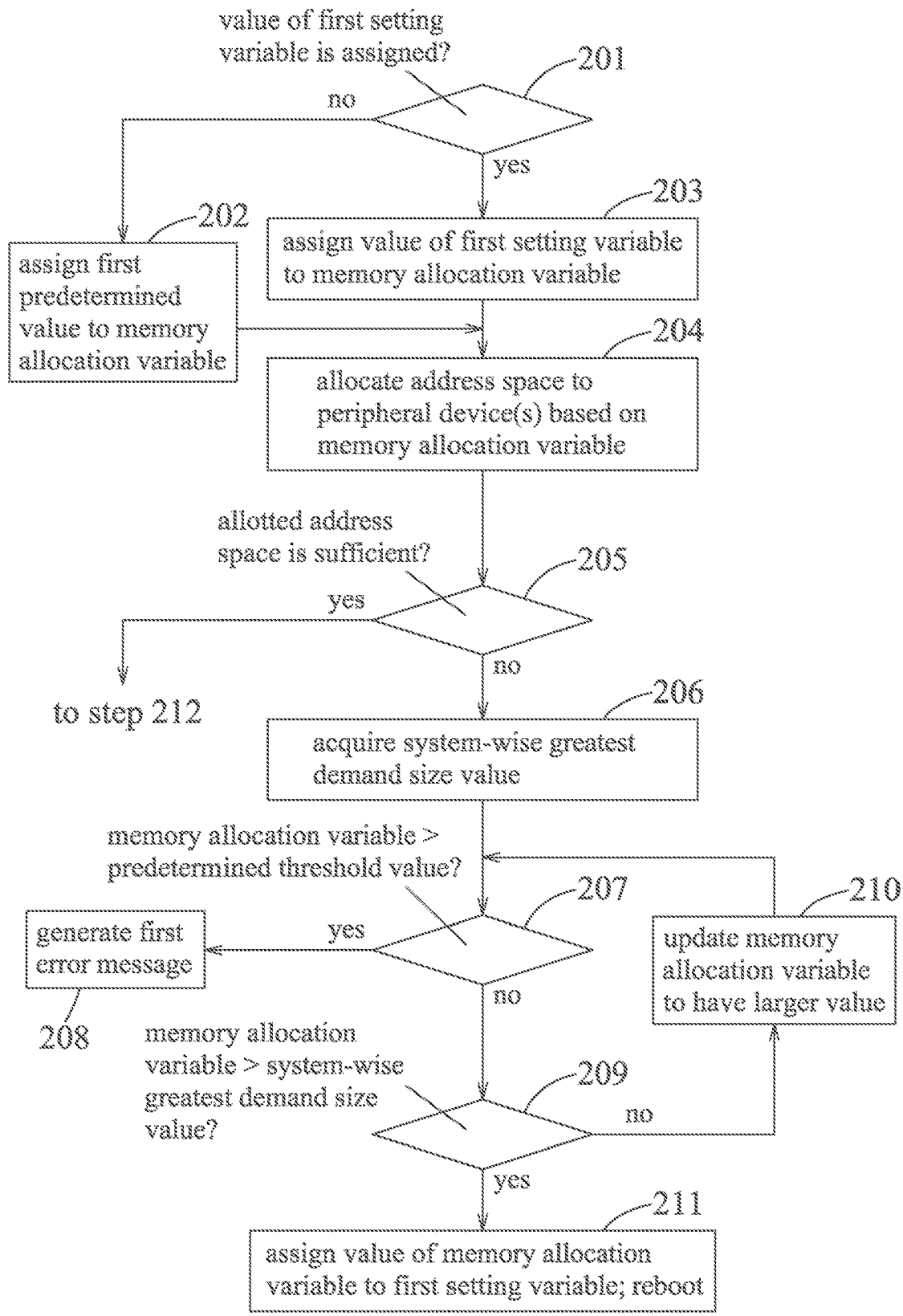
FIG. 2 is a flow chart that exemplarily illustrates a first portion of a method for allocating address space according to an embodiment of the disclosure.
Figure 3:
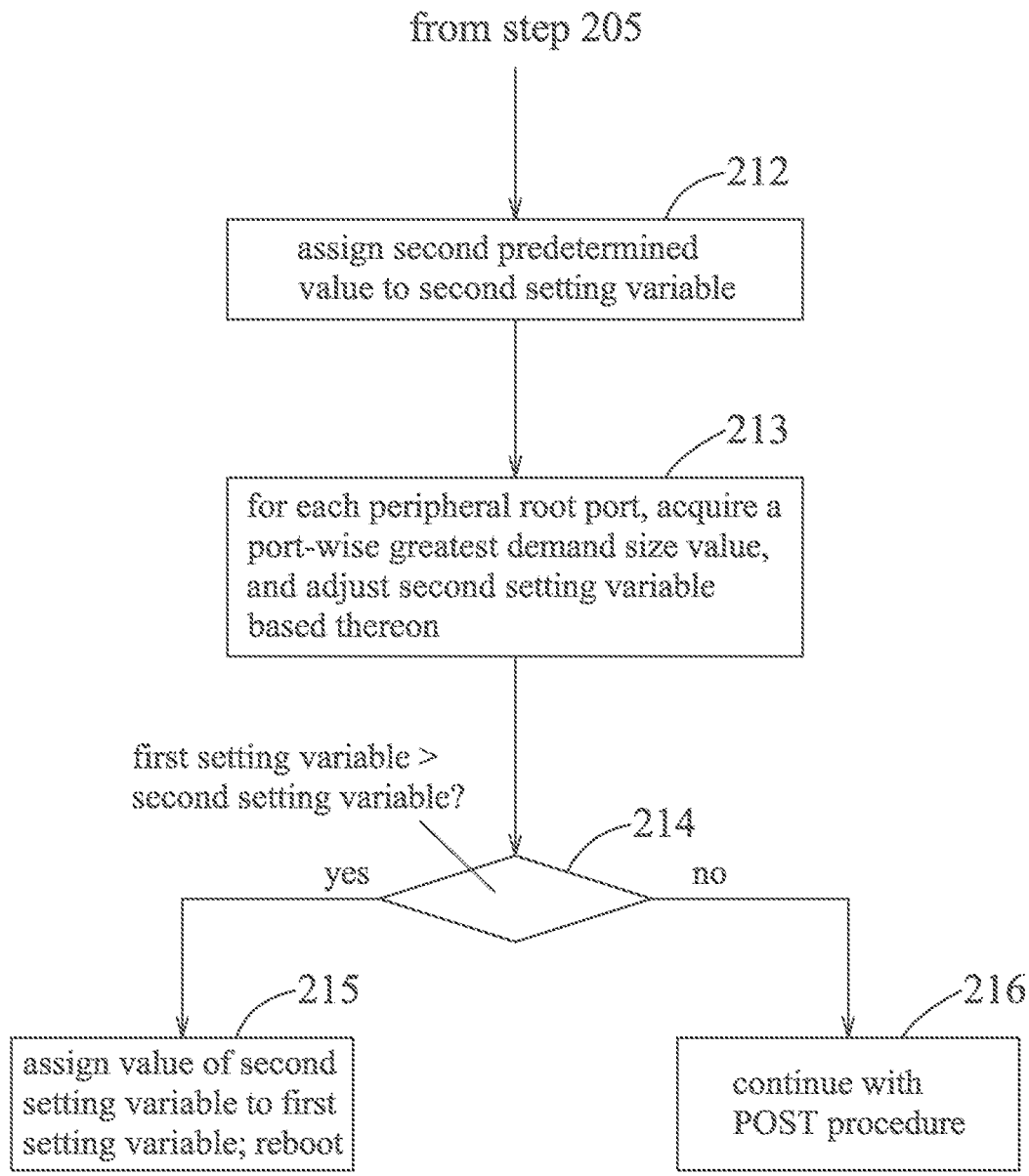
FIG. 3 is a flow chart that exemplarily illustrates a second portion of the method for allocating address space according to an embodiment of the disclosure.

FIGS. 2 and 3 cooperatively illustrate a method for automatically allocating address space (i.e., memory address space) to be used by memory-mapped input/output (MMIO) that may be performed by the computer system of FIG. 1 according to an embodiment of the disclosure. The method is to be performed by the processing unit 12 when the processing unit 12 is performing the POST procedure after the computer system is powered on. Referring to FIGS. 2 and 3, the method includes steps 201-216, wherein steps 201-211 are shown in FIG. 2 and steps 212-216 are shown in FIG. 3.

Referring to FIG. 2, in step 201, the processing unit 12 determines whether a first setting variable is assigned a value in the BIOS code. If so (i.e., the first setting variable is assigned a value), the process goes to step 203; otherwise (i.e., the first setting variable is not assigned a value), the process goes to step 202.

In step 202, the processing unit 12 assigns a first predetermined value to a memory allocation variable that is related to a space size in connection with allocation of the address space. In an embodiment, the first predetermined value corresponds to one gigabyte (i.e., 1 GB), but the disclosure is not limited thereto. On the other hand, in step 203, the processing unit 12 assigns the value of the first setting variable to the memory allocation variable.

After the memory allocation variable has been assigned a value (i.e., the first predetermined value or the value of the first setting variable) in either step 202 or step 203, in step 204, the processing unit 12 allocates, individually for each of the peripheral devices 131 connected to the peripheral root ports 13, address space to the peripheral device 131 based on the memory allocation variable. That is, the processing unit 12 allots, individually to each peripheral device 131, an address range that has a size equal to the size indicated by the memory allocation variable. The ranges of addresses allotted to the peripheral devices 131 do not overlap. The address space allocated to a peripheral device 131 (i.e., the range of addresses allotted to the peripheral device 131) is a portion of the overall memory address space shared by local memory devices of the computer system (e.g., the storage unit 11 and the memory 14) and memory devices controlled by or pertaining to the peripheral device 131, and is only for use by the memory device(s) controlled by or pertaining to the peripheral device 131.

In step 205, the processing unit 12 determines whether every peripheral device 131 has been allotted a sufficient amount of the address space (that is, whether the range of addresses allotted to the peripheral device 131 fulfills a requirement of the peripheral device 131). If so (i.e., every peripheral device 131 has been allotted a sufficient amount of the address space), the process goes to step 212 (details thereof will be described below with reference to FIG. 3); otherwise (i.e., not every peripheral device 131 has been allotted a sufficient amount of the address space), the process goes to step 206. According to an embodiment, the processing unit 12 may determine whether a peripheral device 131 has been allotted a sufficient amount of the address space by sending an inquiry to the peripheral root port 13 that is electrically connected to the peripheral device 131 to inquire about an address space size that is demanded by the peripheral device 131, and by comparing the size of the address space that is currently allotted to the peripheral device 131 with the address space size demanded by the peripheral device 131.

In step 206, the processing unit 12 acquires a system-wise greatest demand size value that is related to address space sizes respectively demanded by the peripheral devices 131 connected to the peripheral root ports 13. According to an embodiment of the disclosure, the processing unit 12 may first acquire, with respect to each of the peripheral root ports 13, at least one address space size respectively demanded by the at least one peripheral device 131 connected to the peripheral root port 13 by reading information about the at least one address space size from the peripheral root port 13 or by sending an inquiry to the peripheral root port 13 for said information. In this way, the address space sizes respectively demanded by all of the peripheral devices 131 are acquired by the processing unit 12. The processing unit 12 may then acquire the system-wise greatest demand size value by determining a greatest one of the address space sizes of all of the peripheral devices 131.

In step 207, the processing unit 12 determines whether the memory allocation variable exceeds a predetermined threshold value that serves as an upper limit of the size of the address space that is permitted to be allotted to each peripheral device 131. If so (i.e., the memory allocation variable exceeds the predetermined threshold value), the process goes to step 208; otherwise (i.e., the memory allocation variable does not exceed the predetermined threshold value), the process goes to step 209. In an embodiment, the predetermined threshold value corresponds to 1024 gigabytes, but the disclosure is not limited thereto.

In step 208, the processing unit 12 generates a first error message, and delivers the first error message to a user of the computer system by, for example, displaying the first error message via a display or audibly outputting the first error message via a speaker.

On the other hand, in step 209, the processing unit 12 determines whether the memory allocation variable exceeds the system-wise greatest demand size value. If so (i.e., the memory allocation variable exceeds the system-wise greatest demand size value), the process goes to step 211; otherwise (i.e., the memory allocation variable does not exceed the system-wise greatest demand size value), the process goes to step 210.

In step 210, the processing unit 12 updates the memory allocation variable to have a larger value, and then the process returns to step 207. In an embodiment, the processing unit 12 updates the memory allocation variable in step 210 by using a four-times-update policy that makes the memory allocation variable have a value that is four times the value that the memory allocation variable originally has, but the disclosure is not limited thereto.

It should be noted that according to some embodiments of the disclosure, steps 207 and 206 may be omitted. In these embodiments, the process directly goes to step 209 after step 206, and returns to step 209 after step 210.

In step 211, the processing unit 12 assigns the value of the memory allocation variable to the first setting variable in the BIOS code that is stored in the storage unit 11, and then controls the computer system to reboot. It should be noted that the method will be performed again (starting from step 201) after the computer system reboots. In the next occurrence of step 201, the first setting variable in the BIOS code will have been assigned a value (i.e., the value of the memory allocation variable in step 211) that is larger than the system-wise greatest demand size value related to the peripheral devices 131 and that guarantees that each peripheral device 131 is allotted a sufficient amount of the address space in the next occurrence of step 204. Therefore, after the next occurrence of step 205, the process will go to step 212.

For example, in a case where the first setting variable is not assigned a value in the BIOS code when the method is initially performed, the first predetermined value corresponds to 1 gigabyte, the system-wise greatest demand size value related to the peripheral devices 131 corresponds to 16 gigabytes, and the four-times-update policy mentioned above is utilized, the memory allocation variable would be assigned a value corresponding to 1 gigabyte in step 202, and the process would go through step 210 three times, in which the value of the memory allocation variable would be updated to correspond to 4 gigabytes, 16 gigabytes and 64 gigabytes respectively, before finally reaching step 211. The value of the memory allocation variable that corresponds to 64 gigabytes would be assigned to the first setting variable in the BIOS code, and then the computer system would reboot. In this case, after the computer system reboots following step 211, the processing unit 12 performing the method would allocate sufficient address space to each peripheral device 131 in step 204 based on the value of the memory allocation variable (equal to the value of the first setting variable in the BIOS code) that corresponds to 64 gigabytes and that exceeds the system-wise greatest demand size value corresponding to 16 gigabytes, and then the process would go to step 212 after passing the determination made in step 205.

Referring to FIG. 3, in step 212, the processing unit 12 assigns a second predetermined value to a second setting variable, wherein the second predetermined value is less than the first second predetermined value. In an embodiment, the second predetermined value is zero, but the disclosure is not limited thereto.

In step 213, with respect to each of the peripheral root ports 13, the processing unit 12 acquires a port-wise greatest demand size value related to at least one address space size that is respectively demanded by the at least one peripheral device 131 connected to the peripheral root port 13, and adjusts the second setting variable based on the port-wise greatest demand size value. Step 213 includes sub-steps 2131-2137 that are to be performed with respect to each of the peripheral root ports 13 and that are illustrated in FIG. 4.

Figure 4:
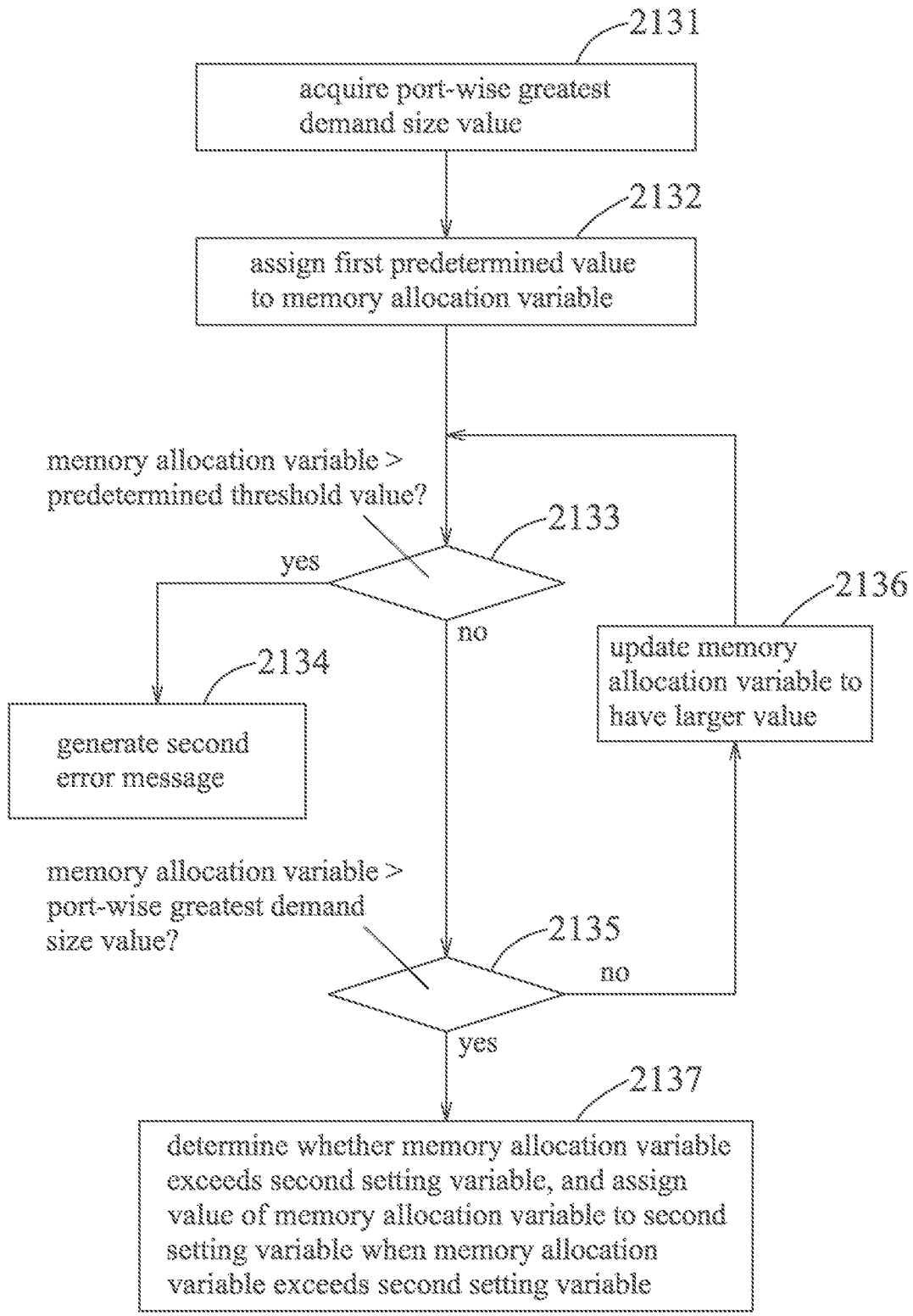
FIG. 4 is a flow chart that exemplarily illustrates sub-steps of step 213 of FIG. 3.

Referring to FIG. 4, in sub-step 2131, the processing unit 12 acquires the port-wise greatest demand size value for the peripheral root port 13 (one of the peripheral root ports 13 that is currently under concern). According to an embodiment of the disclosure, the processing unit 12 may acquire the port-wise greatest demand size value by first acquiring at least one address space size respectively demanded by the at least one peripheral device 131 connected to the peripheral root port 13 by reading information about the at least one address space size from the peripheral root port 13 or by sending an inquiry to the peripheral root port 13 for said information, and then determining a greatest one of the at least one address space size to serve as the port-wise greatest demand size value.

In sub-step 2132, the processing unit 12 assigns the first predetermined value (which may, for example, correspond to one gigabyte) to the memory allocation variable.

In sub-step 2133, the processing unit 12 determines whether the memory allocation variable exceeds the predetermined threshold value (which may, for example, correspond to 1024 gigabytes). If so (i.e., the memory allocation variable exceeds the predetermined threshold value), the process goes to sub-step 2134; otherwise (i.e., the memory allocation variable does not exceed the predetermined threshold value), the process goes to sub-step 2135.

In step 2134, the processing unit 12 generates a second error message, and delivers the second error message to a user of the computer system by, for example, displaying the second error message via a display or audibly outputting the second error message via a speaker.

On the other hand, in sub-step 2135, the processing unit 12 determines whether the memory allocation variable exceeds the port-wise greatest demand size value acquired in sub-step 2131. If so (i.e., the memory allocation variable exceeds the port-wise greatest demand size value), the process goes to sub-step 2137; otherwise (i.e., the memory allocation variable does not exceed the port-wise greatest demand size value), the process goes to sub-step 2136.

In sub-step 2136, the processing unit 12 updates the memory allocation variable to have a larger value, and then the process returns to sub-step 2133. In an embodiment, the processing unit 12 updates the memory allocation variable in sub-step 2136 by utilizing the four-times-update policy mentioned above, but the disclosure is not limited thereto.

It should be noted that according to some embodiments of the disclosure, sub-steps 2133 and 2134 may be omitted. In these embodiments, the process directly goes to sub-step 2135 after sub-step 2132, and returns to sub-step 2135 after sub-step 2136.

In sub-step 2137, the processing unit 12 determines whether the memory allocation variable exceeds the second setting variable, and assigns the value of the memory allocation variable to the second setting variable when it is determined that the memory allocation variable exceeds the second setting variable. Otherwise, when it is determined that the memory allocation variable does not exceed the second setting variable, the value of the second setting variable is kept unchanged.

It can be perceived that after the sub-steps of step 213 of FIG. 3, as shown in FIG. 4, have been performed with respect to each of the peripheral root ports 13, the second setting variable in the BIOS code would have a value that corresponds to an address space size that may fulfill the requirement of every single peripheral device 131 connected to the peripheral root ports 13 and that does not go beyond the address space sizes the peripheral devices 131 actually demand by too much.

Returning back to FIG. 3, in step 214 after step 213, the processing unit 12 determines whether the first setting variable in the BIOS code exceeds the second setting variable in the BIOS code. If so (i.e., the first setting variable exceeds the second setting variable), the process goes to step 215; otherwise (i.e., the first setting variable does not exceed the second setting variable), the process goes to step 216.

In step 215, the processing unit 12 assigns the value of the second setting variable to the first setting variable, and then controls the computer system to reboot in order for the method to run again from step 201.

On the other hand, in step 216, the processing unit 12 continues the POST procedure. At this time point, sufficient address space has been successfully allocated for each of the peripheral devices 131.

The disclosed method is beneficial in that allocation of address space for peripheral devices 131 can be automatically completed without manual operation. Moreover, the size of the address space that is allotted to each peripheral device 131 can be automatically adjusted based on actual demand of the peripheral devices 131 that are being electrically connected to the peripheral root ports 13 each time the computer system reboots. In the disclosed method, the size of the address space to be allotted to each peripheral device 131 is mainly controlled by the first setting variable in the BIOS code. When the value of the first setting variable in the BIOS code is adequate (i.e., being sufficient but not overly large) for the peripheral devices 131 that are being electrically connected to the peripheral root ports 13 when the disclosed method is being performed (in a POST procedure during booting of the computer system), the process goes through step 205 to step 212 and further to step 215 to continue the POST procedure, with each of the peripheral devices 131 having been allotted an address space of a size corresponding to the value of the first setting variable in the BIOS code. When the value of the first setting variable in the BIOS code is insufficient to fulfill the demand of the peripheral devices 131, the value of the first setting variable would be adjusted (enlarged) by using steps 206-211. When the value of the first setting variable in the BIOS code is sufficient to satisfy the demand of the peripheral devices 131, the disclosed method tries to reduce the value of the first setting variable while still keeping the value of the first setting variable in the BIOS code sufficient by using steps 212-215, in order to reduce waste of address space.

For example, in a case where five peripheral devices 131 are electrically connected to the peripheral root ports 13 of the computer system during first booting of the computer system, and where the first setting variable in the BIOS code has a first value that is determined with respect to the five peripheral devices 131 after a first performance of the disclosed method corresponding to the first booting, when the computer system reboots later with one of the five peripheral devices 131 removed or disabled, a second performance of the disclosed method corresponding to second booting would try to reduce the value of the first setting variable in the BIOS code to a smaller, second value in steps 212-215 in order to save resources. In contrast, when the second booting of the computer system occurs with a new peripheral device 131 in addition to the five peripheral devices 131 having been added to the computer system, the second performance of the disclosed method corresponding to the second booting would try to enlarge the value of the first setting variable in the BIOS code to a larger, third value in steps 206-211 if the first value is insufficient for the new peripheral device 131.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for allocating address space to be used by memory-mapped input/output (MMIO), the method to be performed by a processing unit performing a power-on self-test (POST) procedure, the processing unit being included in a computer system that further includes a storage unit, in which a basic input/output system (BIOS) code that can be executed by the processing unit to perform the POST procedure is stored, and multiple peripheral root ports electrically connected to multiple peripheral devices, each of the peripheral root ports electrically connected to at least one peripheral device among the multiple peripheral devices, the method comprising steps of:
  A) determining whether a first setting variable is assigned a value in the BIOS code;
  B) when it is determined in step A) that the first setting variable is assigned a value in the BIOS code, assigning the value of the first setting variable to a memory allocation variable that is related to a space size for allocating the address space;
  C) when it is determined in step A) that the first setting variable is not assigned a value in the BIOS code, assigning a first predetermined value to the memory allocation variable;
  D) for each of the peripheral devices, allocating address space to the peripheral device based on the memory allocation variable;
  E) after step D), determining whether every one of the peripheral devices has been allocated a sufficient amount of the address space;
  F) when it is determined in step E) that not every one of the peripheral devices has been allocated a sufficient amount of the address space, acquiring a system-wise greatest demand size value related to address space sizes respectively demanded by the peripheral devices;
  G) after step F), determining whether the memory allocation variable exceeds the system-wise greatest demand size value;
  H) when it is determined in step G) that the memory allocation variable does not exceed the system-wise greatest demand size value, updating the memory allocation variable to have a larger value; and
  I) when it is determined in step G) that the memory allocation variable exceeds the system-wise greatest demand size value, assigning the value of the memory allocation variable to the first setting variable, and then controlling the computer system to reboot.

2. The method of claim 1, wherein step G) is repeated after performing step H).

3. The method of claim 1, further comprising following steps that are to be performed after the memory allocation variable has been assigned a value:
  J) determining whether the memory allocation variable exceeds a predetermined threshold value; and
  K) when it is determined in step J) that the memory allocation variable exceeds the predetermined threshold value, generating an error message that is to be delivered to a user of the computer system;
  wherein step G) is performed only when it is determined in step J) that the memory allocation variable does not exceed the predetermined threshold value;
  wherein step J) is repeated after performing step H).

4. The method of claim 3, wherein step J) is to determine whether the memory allocation variable exceeds the predetermined threshold value that corresponds to 1024 gigabytes.

5. The method of claim 1, wherein step H) is to update the memory allocation variable to have the larger value which is four times the value that the memory allocation variable originally has.

6. The method of claim 1, further comprising following steps:
  L) when it is determined in step E) that every one of the peripheral devices has been allocated a sufficient amount of the address space, assigning a second predetermined value to a second setting variable, the second predetermined value being less than the first predetermined value;
  M) after step L), with respect to each of the peripheral root ports, acquiring a port-wise greatest demand size value related to at least one address space size that is respectively demanded by the at least one peripheral device connected to the peripheral root port, and adjusting the second setting variable based on the port-wise greatest demand size value;
  N) after step M), determining whether the first setting variable exceeds the second setting variable;
  O) when it is determined in step L) that the first setting variable exceeds the second setting variable, assigning a value of the second setting variable to the first setting variable, and then controlling the computer system to reboot.

7. The method of claim 6, wherein step M) includes following sub-steps that are to be performed with respect to each of the peripheral root ports:
  M-1) acquiring the port-wise greatest demand size value for the peripheral root port;
  M-2) assigning the first predetermined value to the memory allocation variable;
  M-3) after sub-step M-2), determining whether the memory allocation variable exceeds the port-wise greatest demand size value thus acquired;
  M-4) when it is determined in sub-step M-3) that the memory allocation variable does not exceed the port-wise greatest demand size value, updating the memory allocation variable to have a larger value, and then repeating sub-step M-3); and
  M-5) when it is determined in sub-step M-3) that the memory allocation variable exceeds the port-wise greatest demand size value, determining whether the memory allocation variable exceeds the second setting variable, and assigning the value of the memory allocation variable to the second setting variable when the memory allocation variable exceeds the second setting variable.

8. The method of claim 6, further comprising a step of:
  P) when it is determined in step N) that the first setting variable does not exceed the second setting variable, continuing the POST procedure.

9. The method of claim 6, wherein step M) includes following sub-steps that are to be performed with respect to each of the peripheral root ports:
  M-1) acquiring the port-wise greatest demand size value for the peripheral root port;
  M-2) assigning the first predetermined value to the memory allocation variable;
  M-3) after sub-step M-2), determining whether the memory allocation variable exceeds a predetermined threshold value;

M-4) when it is determined in sub-step M-3) that the memory allocation variable exceeds the predetermined threshold value, generating an error message that is to be delivered to a user of the computer system;

M-5) when it is determined in sub-step M-3) that the memory allocation variable does not exceed the predetermined threshold value, determining whether the memory allocation variable exceeds the port-wise greatest demand size value thus acquired;

M-6) when it is determined in sub-step M-5) that the memory allocation variable does not exceed the port-wise greatest demand size value, updating the memory allocation variable to have a larger value, and then repeating sub-step M-3); and M-7) when it is determined in sub-step M-5) that the memory allocation variable exceeds the port-wise greatest demand size value, determining whether the memory allocation variable exceeds the second setting variable, and assigning the value of the memory allocation variable to the second setting variable when the memory allocation variable exceeds the second setting variable.

10. The method of claim 6, wherein step C) is to assign the first predetermined value that corresponds to one gigabyte to the memory allocation variable, and step L) is to assign the second predetermined value that is zero to the second setting variable.

11. A computer system, comprising:
a processing unit;
a storage unit electrically connected to said processing unit and storing a basic input/output system (BIOS) code that can be executed by the processing unit to perform a power-on self-test (POST) procedure;
a peripheral interconnect bus electrically connected to said processing unit;
multiple peripheral root ports electrically connected to said peripheral interconnect bus; and
multiple peripheral devices electrically connected to said peripheral root ports, wherein each of said multiple peripheral root ports is electrically connected to at least one peripheral device among said peripheral devices;
wherein said processing unit is configured to, when performing the POST procedure:
determine whether a first setting variable is assigned a value in the BIOS code;
when it is determined that the first setting variable is assigned a value in the BIOS code, assign the value of the first setting variable to a memory allocation variable that is related to a space size for allocating the address space;
when it is determined that the first setting variable is not assigned a value in the BIOS code, assign a first predetermined value to the memory allocation variable;
for each of said peripheral devices, allocate address space to said peripheral device based on the memory allocation variable;
determine whether every one of said peripheral devices has been allocated a sufficient amount of the address space;
when it is determined that not every one of said peripheral devices has been allocated a sufficient amount of the address space, acquire a system-wise greatest demand size value related to address space sizes respectively demanded by said peripheral devices;

determine whether the memory allocation variable exceeds the system-wise greatest demand size value;
when it is determined that the memory allocation variable does not exceed the system-wise greatest demand size value, update the memory allocation variable to have a larger value; and
when it is determined that the memory allocation variable exceeds the system-wise greatest demand size value, assign the value of the memory allocation variable to the first setting variable, and then controlling the computer system to reboot.

12. The computer system of claim 11, wherein said processing unit is further configured to determine whether the memory allocation variable exceeds the system-wise greatest demand size value after updating the memory allocation variable to have a larger value.

13. The computer system of claim 11, wherein:
said processing unit is further configured to, after the memory allocation variable has been assigned a value:
determine whether the memory allocation variable exceeds a predetermined threshold value; and
when it is determined that the memory allocation variable exceeds the predetermined threshold value, generate an error message that is to be delivered to a user of the computer system; and
said processing unit is further configured to determine whether the memory allocation variable exceeds the system-wise greatest demand size value only when it is determined that the memory allocation variable does not exceed the predetermined threshold value.

14. The computer system of claim 13, wherein said processing unit is further configured to determine whether the memory allocation variable exceeds the predetermined threshold value that corresponds to 1024 gigabytes.

15. The computer system of claim 11, wherein said processing unit is further configured to update the memory allocation variable to have the larger value which is four times the value that the memory allocation variable originally has.

16. The computer system of claim 11, wherein said processing unit is further configured to, when performing the POST procedure:
when it is determined that every one of said peripheral devices has been allocated a sufficient amount of the address space, assign a second predetermined value to a second setting variable, the second predetermined value being less than the first predetermined value;
with respect to each of said peripheral root ports, acquire a port-wise greatest demand size value related to at least one address space size that is respectively demanded by said at least one peripheral device connected to said peripheral root port, and adjust the second setting variable based on the port-wise greatest demand size value;
determine whether the first setting variable exceeds the second setting variable;
when it is determined that the first setting variable exceeds the second setting variable, assign a value of the second setting variable to the first setting variable, and then control the computer system to reboot.

17. The computer system of claim 16, wherein said processing unit is further configured to, with respect to each of said peripheral root ports:
acquire the port-wise greatest demand size value for said peripheral root port;
assign the first predetermined value to the memory allocation variable;

determine whether the memory allocation variable exceeds the port-wise greatest demand size value thus acquired;

when it is determined that the memory allocation variable does not exceed the port-wise greatest demand size value, update the memory allocation variable to have a larger value; and when it is determined that the memory allocation variable exceeds the port-wise greatest demand size value, determine whether the memory allocation variable exceeds the second setting variable, and assign the value of the memory allocation variable to the second setting variable when the memory allocation variable exceeds the second setting variable.

18. The computer system of claim 16, wherein said processing unit is further configured to:

when it is determined that the first setting variable does not exceed the second setting variable, continue the POST procedure.

19. The computer system of claim 16, wherein said processing unit is further configured to, with respect to each of said peripheral root ports:

acquire the port-wise greatest demand size value for said peripheral root port;

assign the first predetermined value to the memory allocation variable;

determine whether the memory allocation variable exceeds a predetermined threshold value;

when it is determined that the memory allocation variable exceeds the predetermined threshold value, generate an error message that is to be delivered to a user of the computer system;

when it is determined that the memory allocation variable does not exceed the predetermined threshold value, determine whether the memory allocation variable exceeds the port-wise greatest demand size value thus acquired;

when it is determined that the memory allocation variable does not exceed the port-wise greatest demand size value, update the memory allocation variable to have a larger value; and when it is determined that the memory allocation variable exceeds the port-wise greatest demand size value, determine whether the memory allocation variable exceeds the second setting variable, and assign the value of the memory allocation variable to the second setting variable when the memory allocation variable exceeds the second setting variable.

20. The computer system of claim 16, wherein said processing unit is further configured to assign the first predetermined value that corresponds to one gigabyte to the memory allocation variable, and to assign the second predetermined value that is zero to the second setting variable.

* * * * *